(12) United States Patent
Zimmerman et al.

(10) Patent No.: US 11,442,990 B2
(45) Date of Patent: Sep. 13, 2022

(54) ASSERTED RELATIONSHIP DATA STRUCTURE

(71) Applicant: LiveRamp, Inc., San Francisco, CA (US)

(72) Inventors: Adam Zimmerman, Conway, AR (US); Dwayne Collins, Conway, AR (US); Pavan Marupally, Conway, AR (US)

(73) Assignee: LiveRamp, Inc., San Francisco, CA (US)

( * ) Notice: Subject to any disclaimer, the term of this patent is extended or adjusted under 35 U.S.C. 154(b) by 0 days.

(21) Appl. No.: 17/223,470

(22) Filed: Apr. 6, 2021

(65) Prior Publication Data

US 2021/0319063 A1    Oct. 14, 2021

Related U.S. Application Data

(60) Provisional application No. 63/006,963, filed on Apr. 8, 2020.

(51) Int. Cl.
  *G06F 16/901* (2019.01)
  *G06F 16/28* (2019.01)
  *G06F 16/25* (2019.01)

(52) U.S. Cl.
  CPC ........ *G06F 16/9024* (2019.01); *G06F 16/254* (2019.01); *G06F 16/285* (2019.01)

(58) Field of Classification Search
  None
  See application file for complete search history.

(56) References Cited

U.S. PATENT DOCUMENTS

| | | | |
|---|---|---|---|
| 7,523,117 B2 | 4/2009 | Zhang et al. | |
| 9,218,427 B1* | 12/2015 | Thompson, III | .... G06F 16/9024 |
| 9,344,447 B2 | 5/2016 | Cohen et al. | |
| 9,614,807 B2 | 4/2017 | Spivack et al. | |
| 9,898,604 B2 | 2/2018 | Fang et al. | |
| 10,110,617 B2 | 10/2018 | Muddu et al. | |
| 10,503,755 B2 | 12/2019 | Anderson | |
| 2010/0153862 A1* | 6/2010 | Schreiber | ........... G06Q 30/0273 726/8 |

(Continued)

OTHER PUBLICATIONS

Mayer, Ruben et al., "GraphCEP-Real-Time Data Analytics Using Parallel Complex Event and Graph Processing," 10th ACM Int'l Conf on Distr. Event-Based Systems (2016).

(Continued)

*Primary Examiner* — Tony Mahmoudi
*Assistant Examiner* — Umar Mian

(57) ABSTRACT

A system and method for transforming input data in a data graph is structured in such a way that it does not destroy embedded contextual data yet also keeps the number of edges in the data graph sufficiently small in number that computation with respect to the data in the data graph is feasible with existing computational resources on extremely large graph sets. Incoming data is represented as a collection of "cliques" rather than placing each data object into its own node in the graph database. Maintaining the clique structure though the graph build pipeline dramatically reduces the exponential increase in the number of edges in the graph, while also maintaining all of the contextual data presented on the input record.

8 Claims, 2 Drawing Sheets

(56) References Cited

U.S. PATENT DOCUMENTS

| | | | |
|---|---|---|---|
| 2011/0082670 A1* | 4/2011 | McAuley | G06F 17/10 |
| | | | 703/2 |
| 2013/0231862 A1* | 9/2013 | Delling | G01C 21/3446 |
| | | | 701/527 |
| 2013/0238356 A1 | 9/2013 | Torii et al. | |
| 2016/0219066 A1 | 7/2016 | Vasseur et al. | |
| 2017/0124464 A1 | 5/2017 | Crabtree et al. | |
| 2017/0337293 A1 | 11/2017 | Farkash et al. | |
| 2017/0365071 A1* | 12/2017 | Rossi | H03M 7/30 |
| 2018/0203917 A1 | 7/2018 | Marshall et al. | |
| 2019/0207960 A1 | 7/2019 | Chu et al. | |
| 2019/0311219 A1* | 10/2019 | Alabdulmohsin | G06F 16/9024 |

OTHER PUBLICATIONS

Fang, Xing et al., "Toward Network Reduction on Big Data," SocialCom/PASSAT/BigData/EconCom/BioMedCom 385-690 (2013).
Schaeffer, Satu Elisa, "Graph Clustering," Computer Science Review I 27-64 (2007).

* cited by examiner

ASSERTED RELATIONSHIP DATA STRUCTURE

CROSS-REFERENCE TO RELATED APPLICATIONS

This application claims the benefit of U.S. provisional patent application No. 63/006,963, entitled "Asserted Relationship Data Structure," filed on Apr. 8, 2020. Such application is incorporated herein by reference in its entirety.

BACKGROUND OF THE INVENTION

When data is presented for ingestion into a final storage database, such as a data warehouse, data mart, data lake, or data graph, the data traditionally is moved through an "extract, transform, load" (ETL) process. The extract process may involve extracting data from disparate sources, being either homogeneous or heterogeneous. The transformation process may include data hygiene and formatting in order to create the proper format and structure for the intended final storage database. The load process is simply inserting the data into the final storage database at the desired location.

Whenever data is presented for ingestion, there always exists some embedded context that is not explicitly declared as data elements or values. The context could be as simple as the fact that all of these records, or fields within a single record, come from the same source. It may also include associations between different data elements by virtue of the fact that they share a connection with another element or elements. The typical ETL process often destroys these implicit or hidden connections between data elements by way of lossy transformations. For example, the following provides an input and output using traditional ETL processes:

Input:
Name, email1, email 2
Output:
Name, email 1
Name, email 2

As may be seen in this example, the connection between email1 and email2 is lost in the ETL process. Because the information has been lost, no downstream data processes may take advantage of this contextual information.

Data may be stored in a data graph, which is a data structure in which the nodes of the graph are the data elements and the edges are the relationships between the data elements. The use of a graph structure for certain data types is beneficial due to the varying nature of the data being processed. For example, there are various degrees of ephemerality associated with data in different identity graphs as well as various degrees of connectivity between nodes in these graphs. Generally speaking, the ingestion of data into a graph will be enabled through some form of file transmittal (such as SFTP) or an API connector. Data must be presented with a schema that allows particular data elements to be treated appropriately. The capture of incoming data in the structure of an asserted relationship may preserve as much context as possible while allowing graph building processes to be optimized in terms of handling the number of edges present. The real-world use of data in a data graph ends up being a graph clustering problem, that is, certain data elements in the graph belong to object A and other data elements belong to object B. To group data elements by object, a file may be produced with common identifiers that represent the relationship between each group of data elements and is assigned and persisted to each group of data elements.

Data submitted for ingestion may be conceived as a form of a data graph. One of those relationships may simply be the fact that data elements were derived from the same source or ingested together. For example, a record to be ingested may be considered as a collection of 1 to n nodes in a data graph, with the edges between those nodes being the implicit fact that they are presented together as a single record. Consider the following simple example of three data objects represented by nodes connected by edges:

Node1-Node2
Node2-Node3
Node1-Node3

The variable nature of the input edges from heterogeneous data sources requires traditional ETL processes to "fit" the input data into the rigid structure of the database scheme. This often involves a bursting process (i.e., removing the connections between nodes) in which edge information between nodes is lost. Thus the application of a graph data structure does not itself solve the problem of lost implicit data.

The graph data structure does allow for much more flexibility in the types of data that can be captured, and therefore utilized by downstream data processes. It also allows for the use of many standard algorithms that are known from the world of graph theory. But this creates a problem of scale. In the present world of "Big Data," database structures may contain billions or trillions of individual data elements. If these data elements are represented as nodes in a graph database, then the number of potential edges becomes exponentially large. The number of edges would be so large that no available computational resources would be able to perform desired processes on the data, and the database would thus become unusable.

References mentioned in this background section are not admitted to be prior art with respect to the present invention.

BRIEF SUMMARY OF THE INVENTION

The present invention is directed to a system and method for transforming input data in a data graph in such a way that does not destroy embedded contextual data, i.e., asserted relationships are not lost in the data structure. At the same time, the database is structured in a way that the number of edges in the data graph are sufficiently small in number that computation with respect to the data in the data graph is feasible with existing computational resources. Incoming data is represented as a collection of "cliques" rather than placing each data object into its own node in the graph database. In graph theory, a clique is a subset of vertices of an undirected graph such that every two distinct vertices in the clique are adjacent. As used herein in the context of data structures, the clique structure is a graph or sub-graph in which an edge exists between every pair of nodes. Maintaining the clique structure though the graph build pipeline according to certain implementations of the invention dramatically reduces the exponential increase in the number of edges in the graph, while also maintaining all of the contextual data presented on the input record that would be lost using traditional ETL intake processes used with typical relational databases.

Estimation of processing times have revealed dramatic gains in performance using implemented embodiments of the present invention. In one example using a very large graph database, a real-world example of a computing system using 2,000 CPU cores and 2 TB of RAM memory was employed. The data consisted of approximately 100 million cliques, which results in a number on the order of 3 trillion edges. (It will be readily understood that representing the data with individual nodes for each data object would have resulted in a number of edges far too vast to be computationally feasible.) The inventors found that by representing the data as cliques rather than individual nodes for each data object, the full contextual data was retained but the processing time would be roughly four orders of magnitude smaller than the standard graph processing techniques. As the various Big Data platforms continue to scale upwards into the petabyte range, these techniques become more and more valuable, as the quantity of data is so great that it simply cannot be implemented in a graph database (for example, Neo4J and dGraph) and still be usable with existing computational resources in a meaningful timescale.

These and other features, objects and advantages of the present invention will become better understood from a consideration of the following detailed description of the preferred embodiments in conjunction with the drawing and appended claims.

DETAILED DESCRIPTION OF THE PREFERRED EMBODIMENT(S)

Figure 1:
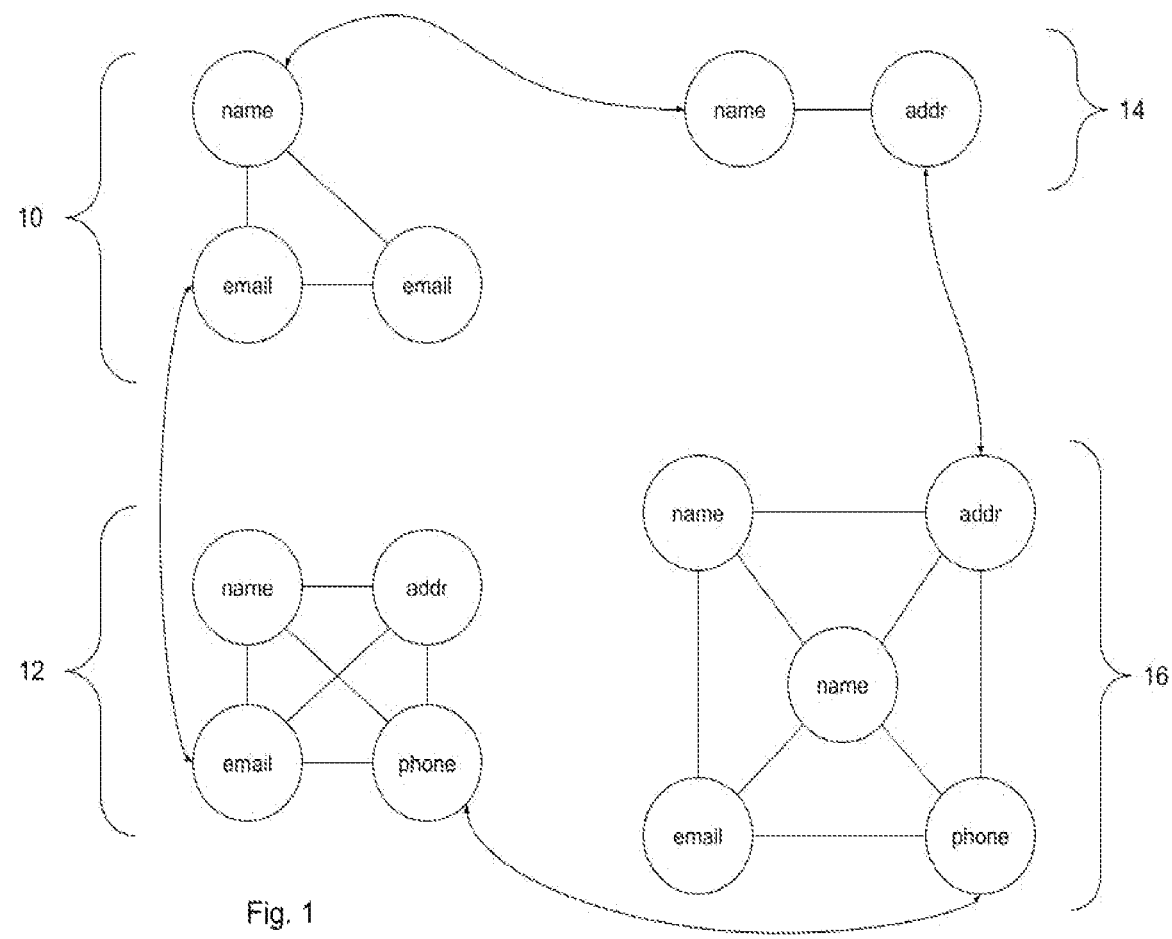
FIG. 1 provides a logical structure for an exemplary clique structure within a data graph according to an embodiment of the present invention.

Before the present invention is described in further detail, it should be understood that the invention is not limited to the particular embodiments described, and that the terms used in describing the particular embodiments are for the purpose of describing those particular embodiments only, and are not intended to be limiting, since the scope of the present invention will be limited only by the claims.

Processing in an implementation of the invention is performed using asserted relationship documents (ARDocs). Each ARDoc is a data structure that represents a clique, and thus there is a one-to-one relationship between ARDocs and cliques. An ARDoc may be expressed in a particular implementation as a JSON object or as a dictionary or hash map. An ARDoc has an AR ID and it further contains objects for the following: source metadata (metadata from the source record that does not fit into any predetermined fields); match data (response and entity information from the application programming interface (API) that corresponds to the ARDoc); metadata (attached metadata about this record); and touchpoints (individual data elements that are asserted by a source that belong to this relationship).

A sample ARDoc might appear as follows:

```
{
    "id": "XXX123",
    "sourceMetadata": [
        {
            "key": "value",
            "sourceId": "XXX"
        }
    ],
    "touchpoints": {
        "address": [
            {
                "metadata": [
                    {
                        "key": "value"
                    }
                ],
                "city": "XXX",
                "state": "YY",
                "streetAddress":"ZZZ",
                "zipCode": "12345"
            }
        ],
        "email": [
            {
                "email": "XXX@YYY.Z",
            }
        ],
        "phone": [
            {
                "phone": "XXX",
            }
        ],
        "name": [
            {
                "firstName": "XXX",
            },
            {
                "middleName": "Y",
            },
            {
                "lastName": "ZZZ"
            }
        ]
    }
}
```

In each ARDoc, the id field is a unique and deterministic identifier that is computed based on the touchpoint data that is asserted to be related. The field sourceMetadata is a generic construct for housing metadata about the asserted relationship. The use of "key" and "value" are meant to be generic enough to represent any metadata. The field sourceId is an identifier representing the source that provided that metadata.

As more than one source can present the same asserted relationship, it is important to keep metadata associated with the source that provided it. The touchpoints are the specific data elements that have been asserted to be related. If the objects of interest are persons, then the touchpoints may include personally identifiable information such as address, email address, telephone number, and date of birth. The definition of a touchpoint can be expanded to include anonymous identifiers as well, such as device identifiers for smart phones and smart TVs and cookie identifiers. The touchpoints themselves can additionally contain generic key or value metadata. Within each touchpoint type, there can be multiple instances of each touchpoint type. For example, an assertedRelationship may represent two email addresses that have been seen together, so the email array would have length equal to two.

FIG. 1 illustrates the logical structure of multiple cliques in a simplified graph represented visually. The edges between the nodes in the clique illustrate the connections between the touchpoints that are associated with the same clique and hence the same object. In addition, however, the graph structure includes connections between touchpoints associated with different cliques, illustrated by the curved lines with arrows. These lines represent the embedded contextual data that is retained by using the clique graph structure, e.g., the fact that two touchpoints came from the same data source. This data is retained without exponentially increasing the number of edges in the graph by using this particular data structure. More specifically, clique 10 consists of nodes for a name and two associated touchpoints (in this case, email addresses), with the edges connecting each of these nodes to each other. Clique 12 consists of a name and associated email, address, and telephone number touchpoints. The arrow between one of the email nodes in clique 10 and the email node of clique 12 indicates that these nodes involve embedded contextual information, such as for example the fact that the touchpoints came from the same source data, and are thus linked together by an edge between the nodes and therefore between the two cliques. Likewise, clique 14 consists of a name node with the same contextual information as in clique 10, with an address touchpoint associated with it. This address touchpoint provides an edge linking clique 14 with clique 16; in the case of this clique, there are two linked names and an email address, telephone number, and the same address as in clique 14.

Figure 2:
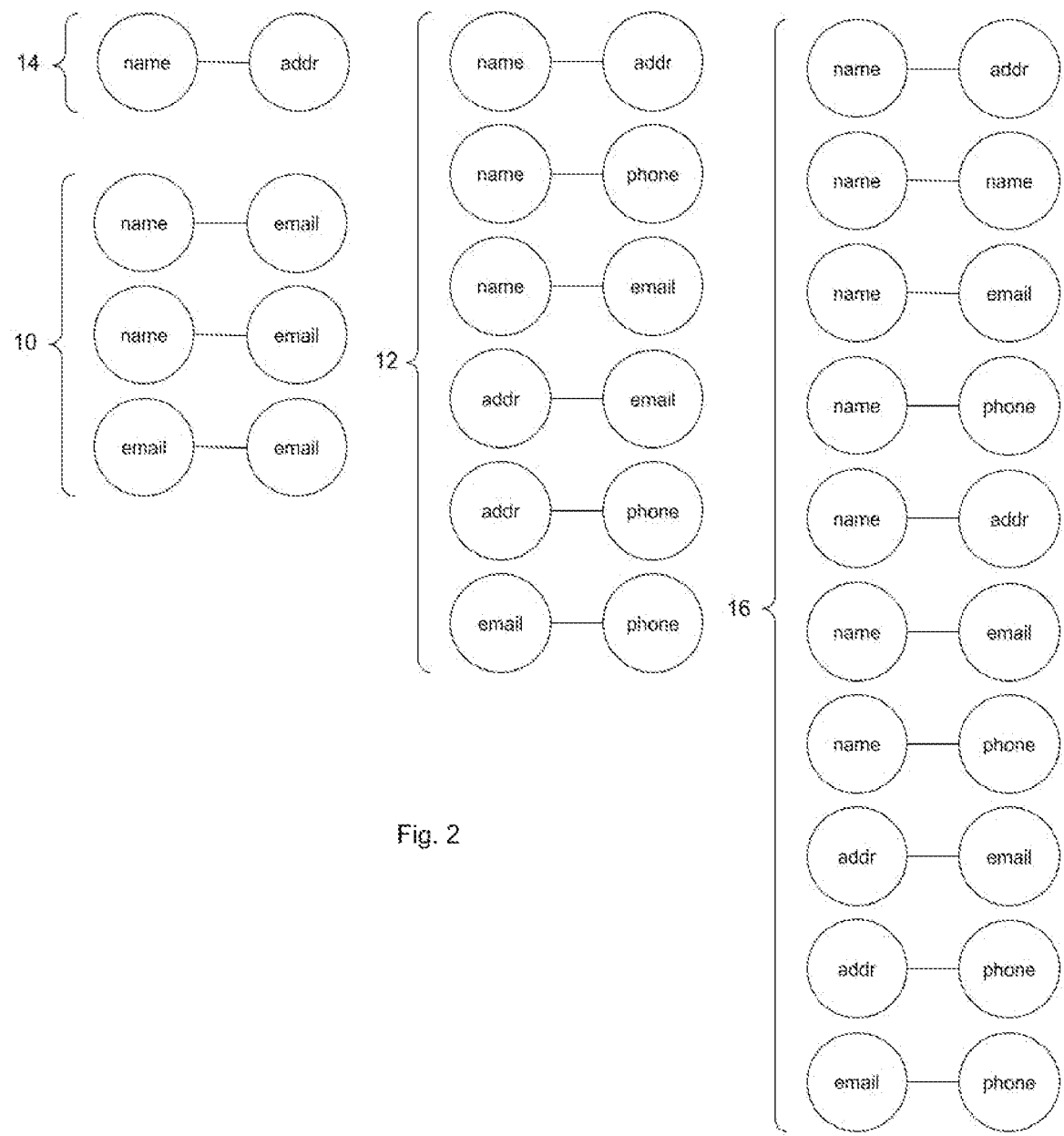
FIG. 2 provides a relational database set corresponding to the clique structure of FIG. 1, according to an implementation of the present invention.

FIG. 2 illustrates the logical structure of the same dataset in FIG. 1 when represented using a traditional relational database. Connections between touchpoints associated with different cliques are identified by the value of the touchpoint which must be duplicated across rows or by generating a unique identifier for each unique touchpoint which must in turn be duplicated across rows. The embedded contextual information in FIG. 1 now requires additional processing to extract using the traditional relational data structure seen in FIG. 2. For example, the name in clique 14 is duplicated in multiple rows of clique 10 and the address in clique 10 is duplicated across multiple rows in clique 16.

An ETL process embodiment of the present invention consists of a python MapReduce program and a json configuration file per unique data source. The json configuration file will define the mapping of the columnar formatted input file into the hierarchical asserted relationship data structure. The python MapReduce program is responsible for performing the following functions:

1. generating a unique and persistent identifier for each asserted relationship;
2. converting the columnar formatted data structure into a hierarchical data structure in json format; and
3. deduplicating the data source using the unique identifier from step 1 and combining data elements across duplicate records by way of list aggregation An example json configuration file is presented below:

```
{
    "sources": [{
        "encoding": "latin-1",
        "format": "csv",
        "delimiter": ",",
        "name": "dataSource001",
        "layout": [
            {
                "fieldName": "source_id",
                "rename": "assertedRelationship.touchpoints.sourceMetadata.0.sourceRecordId"
            },
            {
                "fieldName": "email1",
                "rename": "assertedRelationship.touchpoints.email.0.rawEmail"
            },
            {
                "fieldName": "email2",
                "rename": "assertedRelationship.touchpoints.email.1.rawEmail"
            },
            {
                "fieldName": "email3",
                "rename": "assertedRelationship.touchpoints.email.2.rawEmail"
            },
            {
                "fieldName": "email4",
                "rename": "assertedRelationship.touchpoints.email.3.rawEmail"
            },
            {
                "fieldName": "email5",
                "rename": "assertedRelationship.touchpoints.email.4.rawEmail"
            },
            {
                "fieldName": "email6",
                "rename": "assertedRelationship.touchpoints.email.5.rawEmail"
            },
            {
                "fieldName": "firstname",
                "rename": "assertedRelationship.touchpoints.name.0.rawFirstName"
            },
            {
                "fieldName": "lastname",
                "rename": "assertedRelationship.touchpoints.name.0.rawLastName"
            },
            {
                "fieldName": "address_1",
                "rename": "assertedRelationship.touchpoints.address.0.rawStreetAddress"
            },
            {
                "fieldName": "address_2",
                "rename": "assertedRelationship.touchpoints.address.0.rawStreetAddressLine2"
            },
            {
                "fieldName": "city",
                "rename": "assertedRelationship.touchpoints.address.0.rawCity"
            },
            {
                "fieldName": "state",
                "rename": "assertedRelationship.touchpoints.address.0.rawState"
            },
            {
                "fieldName": "zip",
                "rename": "assertedRelationship.touchpoints.address.0.rawZipCode"
            },
            {
                "fieldName": "zip4",
                "rename": "assertedRelationship.touchpoints.address.0.rawZipExtension"
            },
            {
                "fieldName": "phone",
                "rename": "assertedRelationship.touchpoints.phone.0.rawPhone"
            }
        ]
    }]
}
```

The systems and methods described herein may in various embodiments be implemented by any combination of hardware and software. For example, in one embodiment, the systems and methods may be implemented by a computer system or a collection of computer systems, each of which includes one or more processors executing program instructions stored on a computer-readable storage medium coupled to the processors. The program instructions may implement the functionality described herein. The various systems and displays as illustrated in the figures and described herein represent example implementations. The order of any method may be changed, and various elements may be added, modified, or omitted.

A computing system or computing device as described herein may implement a hardware portion of a cloud computing system or non-cloud computing system, as forming parts of the various implementations of the present invention. The computer system may be any of various types of devices, including, but not limited to, a commodity server, personal computer system, desktop computer, laptop or notebook computer, mainframe computer system, handheld computer, workstation, network computer, a consumer device, application server, storage device, telephone, mobile telephone, or in general any type of computing node, compute node, compute device, and/or computing device. The computing system includes one or more processors (any of which may include multiple processing cores, which may be single or multi-threaded) coupled to a system memory via an input/output (I/O) interface. The computer system further may include a network interface coupled to the I/O interface.

In various embodiments, the computer system may be a single processor system including one processor, or a multiprocessor system including multiple processors. The processors may be any suitable processors capable of executing computing instructions. For example, in various embodiments, they may be general-purpose or embedded processors implementing any of a variety of instruction set architectures. In multiprocessor systems, each of the processors may commonly, but not necessarily, implement the same instruction set. The computer system also includes one or more network communication devices (e.g., a network interface) for communicating with other systems and/or components over a communications network, such as a local area network, wide area network, or the Internet. For example, a client application executing on the computing device may use a network interface to communicate with a server application executing on a single server or on a cluster of servers that implement one or more of the components of the systems described herein in a cloud computing or non-cloud computing environment as implemented in various subsystems. In another example, an instance of a server application executing on a computer system may use a network interface to communicate with other instances of an application that may be implemented on other computer systems.

The computing device also includes one or more persistent storage devices and/or one or more I/O devices. In various embodiments, the persistent storage devices may correspond to disk drives, tape drives, solid state memory, other mass storage devices, or any other persistent storage devices. The computer system (or a distributed application or operating system operating thereon) may store instructions and/or data in persistent storage devices, as desired, and may retrieve the stored instruction and/or data as needed. For example, in some embodiments, the computer system may implement one or more nodes of a control plane or control system, and persistent storage may include the SSDs attached to that server node. Multiple computer systems may share the same persistent storage devices or may share a pool of persistent storage devices, with the devices in the pool representing the same or different storage technologies.

The computer system includes one or more system memories that may store code/instructions and data accessible by the processor(s). The system memories may include multiple levels of memory and memory caches in a system designed to swap information in memories based on access speed, for example. The interleaving and swapping may extend to persistent storage in a virtual memory implementation. The technologies used to implement the memories may include, by way of example, static random-access memory (RAM), dynamic RAM, read-only memory (ROM), non-volatile memory, or flash-type memory. As with persistent storage, multiple computer systems may share the same system memories or may share a pool of system memories. System memory or memories may contain program instructions that are executable by the processor(s) to implement the routines described herein. In various embodiments, program instructions may be encoded in binary, Assembly language, any interpreted language such as Java, compiled languages such as C/C++, or in any combination thereof; the particular languages given here are only examples. In some embodiments, program instructions may implement multiple separate clients, server nodes, and/or other components.

In some implementations, program instructions may include instructions executable to implement an operating system (not shown), which may be any of various operating systems, such as UNIX, LINUX, Solaris™, MacOS™, or Microsoft Windows™. Any or all of program instructions may be provided as a computer program product, or software, that may include a non-transitory computer-readable storage medium having stored thereon instructions, which may be used to program a computer system (or other electronic devices) to perform a process according to various implementations. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to the computer system via the I/O interface. A non-transitory computer-readable storage medium may also include any volatile or non-volatile media such as RAM or ROM that may be included in some embodiments of the computer system as system memory or another type of memory. In other implementations, program instructions may be communicated using optical, acoustical or other form of propagated signal (e.g., carrier waves, infrared signals, digital signals, etc.) conveyed via a communication medium such as a network and/or a wired or wireless link, such as may be implemented via a network interface. A network interface may be used to interface with other devices, which may include other computer systems or any type of external electronic device. In general, system memory, persistent storage, and/or remote storage accessible on other devices through a network may store data blocks, replicas of data blocks, metadata associated with data blocks and/or their state, database configuration information, and/or any other information usable in implementing the routines described herein.

In certain implementations, the I/O interface may coordinate I/O traffic between processors, system memory, and any peripheral devices in the system, including through a network interface or other peripheral interfaces. In some embodiments, the I/O interface may perform any necessary protocol, timing or other data transformations to convert data signals from one component (e.g., system memory) into a format suitable for use by another component (e.g., processors). In some embodiments, the I/O interface may include support for devices attached through various types of peripheral buses, such as a variant of the Peripheral Component Interconnect (PCI) bus standard or the Universal Serial Bus (USB) standard, for example. Also, in some embodiments, some or all of the functionality of the I/O interface, such as an interface to system memory, may be incorporated directly into the processor(s).

A network interface may allow data to be exchanged between a computer system and other devices attached to a network, such as other computer systems (which may implement one or more storage system server nodes, primary nodes, read-only node nodes, and/or clients of the database systems described herein), for example. In addition, the I/O interface may allow communication between the computer system and various I/O devices and/or remote storage. Input/output devices may, in some embodiments, include one or more display terminals, keyboards, keypads, touchpads, scanning devices, voice or optical recognition devices, or any other devices suitable for entering or retrieving data by one or more computer systems. These may connect directly to a particular computer system or generally connect to multiple computer systems in a cloud computing environment, grid computing environment, or other system involving multiple computer systems. Multiple input/output devices may be present in communication with the computer system or may be distributed on various nodes of a distributed system that includes the computer system. The user interfaces described herein may be visible to a user using various types of display screens, which may include CRT displays, LCD displays, LED displays, and other display technologies. In some implementations, the inputs may be received through the displays using touchscreen technologies, and in other implementations the inputs may be received through a keyboard, mouse, touchpad, or other input technologies, or any combination of these technologies.

In some embodiments, similar input/output devices may be separate from the computer system and may interact with one or more nodes of a distributed system that includes the computer system through a wired or wireless connection, such as over a network interface. The network interface may commonly support one or more wireless networking protocols (e.g., Wi-Fi/IEEE 802.11, or another wireless networking standard). The network interface may support communication via any suitable wired or wireless general data networks, such as other types of Ethernet networks, for example. Additionally, the network interface may support communication via telecommunications/telephony networks such as analog voice networks or digital fiber communications networks, via storage area networks such as Fibre Channel SANs, or via any other suitable type of network and/or protocol.

Any of the distributed system embodiments described herein, or any of their components, may be implemented as one or more network-based services in the cloud computing environment. For example, a read-write node and/or read-only nodes within the database tier of a database system may present database services and/or other types of data storage services that employ the distributed storage systems described herein to clients as network-based services. In some embodiments, a network-based service may be implemented by a software and/or hardware system designed to support interoperable machine-to-machine interaction over a network. A web service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP). In some embodiments, network-based services may be implemented using Representational State Transfer (REST) techniques rather than message-based techniques. For example, a network-based service implemented according to a REST technique may be invoked through parameters included within an HTTP method such as PUT, GET, or DELETE.

Unless otherwise stated, all technical and scientific terms used herein have the same meaning as commonly understood by one of ordinary skill in the art to which this invention belongs. Although any methods and materials similar or equivalent to those described herein can also be used in the practice or testing of the present invention, a limited number of the exemplary methods and materials are described herein. It will be apparent to those skilled in the art that many more modifications are possible without departing from the inventive concepts herein.

All terms used herein should be interpreted in the broadest possible manner consistent with the context. When a grouping is used herein, all individual members of the group and all combinations and sub-combinations possible of the group are intended to be individually included in the disclosure. All references cited herein are hereby incorporated by reference to the extent that there is no inconsistency with the disclosure of this specification. When a range is used herein, all points within the range and all subranges within the range are intended to be included in the disclosure.

The present invention has been described with reference to certain preferred and alternative implementations that are intended to be exemplary only and not limiting to the full scope of the present invention.

The invention claimed is:

1. A data storage and retrieval system for a non-transitory computer-accessible medium, comprising:

an asserted relationship data structure graph comprising a plurality of cliques, wherein each of the plurality of cliques comprises a sub-graph comprising a plurality of edges and a plurality of nodes, wherein one of the plurality of edges in each of the plurality of cliques extends between two of the plurality of nodes in each of the plurality of cliques, and each of said cliques comprising a plurality of touchpoints, each touchpoint stored at a vertex of such clique, and each of said plurality of touchpoints belonging to a single relationship;

an input record comprising a set of source data;

a set of source metadata, wherein the source metadata comprises implicit relationship data about the set of source data; and an application programming interface (API) in communication with the asserted relationship data structure graph, wherein the API is configured to transfer the source data and the source metadata from the input record into the plurality of cliques of the asserted relationship data structure graph in order to fill the asserted relationship data structure graph, wherein related data and source metadata is deposited into a single clique in order to maintain a context for the source data;

wherein the asserted relationship data structure graph comprises a total number of asserted relationship data structure graph edges smaller than a total number of standard graph edges in a standard data graph comprising nodes for each item of the source data; and a search feature configured to search the asserted relationship data structure graph for an item of the source data, wherein the search feature performs a search of the asserted relationship data structure graph to find the item of the source data in less time than would be required in the standard data graph.

2. The system of claim 1, wherein each of the plurality of cliques further comprises match data, wherein the match data comprise response and entity information from the application programming interface (API) in communication with the data storage and retrieval system.

3. The system of claim 2, wherein each of the plurality of cliques further comprises metadata about the input record.

4. The system of claim 3, wherein each of the plurality of cliques further comprises an asserted relationship identifier (AR ID).

5. The system of claim 1, wherein the implicit relationship data comprises data indicating that data was received from a single input record.

6. A computerized system for utilizing a graph data structure to store and search for data concerning an entity, the computerized system comprising:

a graph data structure comprising a plurality of existing cliques, wherein each of the plurality of existing cliques comprises a sub-graph comprising a plurality of edges and a plurality of nodes, wherein one of the plurality of edges in each of the plurality of existing cliques extends between two of the plurality of nodes in each of the plurality of existing cliques;

at least one processor;

at least one non-transitory media in communication with the processor, wherein the non-transitory media comprises an instruction set comprising instructions that, when executed at the at least one processor in communication with the at least one processor, are configured to:

receive an input record through an application programming interface (API), wherein the input record comprises a plurality of touchpoints and contextual data pertaining to a relationship between the plurality of touchpoints;

create a new clique within the graph data structure, wherein the new clique comprises a sub-graph comprising a plurality of edges and a plurality of nodes, wherein one of the plurality of edges in each of the plurality of cliques extends between two of the plurality of nodes in each of the plurality of cliques, and wherein the touchpoint data and the contextual data are maintained together within the plurality of nodes of the new clique;

search the graph data structure for one of the plurality of existing cliques that matches the new clique; and add a link to the new clique from such one of the plurality of existing cliques.

7. The computerized system of claim 6, wherein the instruction set, when executed at the at least one processor in communication with the at least one processor, is further configured to:

search the graph data structure for one of the existing plurality of cliques with a link matching a searched link; and return from the graph data structure the contextual data from the existing clique from the plurality of existing cliques with a link matching the searched link.

8. The computerized system of claim 7, wherein the link is an identifier for an entity in a set of entities, wherein each identifier is uniquely associated with one and only one entity in the set of entities.

* * * * *